US008110989B2

(12) United States Patent
Kitagawa et al.

(10) Patent No.: US 8,110,989 B2
(45) Date of Patent: Feb. 7, 2012

(54) LIGHTING CONTROLLER OF LIGHTING DEVICE FOR VEHICLE

(75) Inventors: Takayoshi Kitagawa, Shizuoka (JP); Noriyuki Nakamura, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 417 days.

(21) Appl. No.: 12/342,690

(22) Filed: Dec. 23, 2008

(65) Prior Publication Data

US 2009/0167187 A1 Jul. 2, 2009

(30) Foreign Application Priority Data

Dec. 27, 2007 (JP) ................................ 2007-336070

(51) Int. Cl.
*B60Q 1/14* (2006.01)

(52) U.S. Cl. ............ 315/77; 315/82; 315/309; 315/312

(58) Field of Classification Search .................... 315/77, 315/82, 209 R, 210, 219, 224–226, 291, 294, 315/307–309, 312; 307/10.1, 10.8
See application file for complete search history.

(56) References Cited

U.S. PATENT DOCUMENTS

| | | | | |
|---|---|---|---|---|
| 6,836,081 | B2 * | 12/2004 | Swanson et al. | 315/307 |
| 7,710,050 | B2 * | 5/2010 | Preston et al. | 315/312 |
| 7,755,295 | B2 * | 7/2010 | Kajita et al. | 315/82 |
| 2004/0217712 | A1 * | 11/2004 | Takeda et al. | 315/82 |
| 2005/0023991 | A1 * | 2/2005 | Kemper | 315/291 |
| 2005/0179393 | A1 * | 8/2005 | Murakami et al. | 315/77 |
| 2007/0069664 | A1 * | 3/2007 | Robinson et al. | 315/312 |
| 2009/0153059 | A1 * | 6/2009 | Kitagawa et al. | 315/77 |
| 2009/0200963 | A1 * | 8/2009 | Kitagawa et al. | 315/297 |

FOREIGN PATENT DOCUMENTS

JP 2006-103477 A 4/2006

OTHER PUBLICATIONS

Abstract of JP2006-103477, published on Apr. 20, 2006, 1 page.

* cited by examiner

*Primary Examiner* — Tung X Le
(74) *Attorney, Agent, or Firm* — Osha • Liang LLP

(57) ABSTRACT

A lighting controller of a lighting device for a vehicle includes M (M is an integer of one or more) switching regulators for supplying driving currents to first to Nth (N is an integer of one or more) semiconductor light sources; first to Nth current driving portions; a temperature detector; and a control circuit. The first to Nth current driving portions include first to Nth current detecting portions connected to the semiconductor light sources and serving to detect the driving currents respectively; and first to Nth switching portions connected to the semiconductor light sources respectively. The first to Nth current driving portions operates the switching portions corresponding to magnitudes of the driving currents detected by the current detecting portions respectively. The temperature detector detects a temperature and sends a temperature detecting signal when the detected temperature is equal to or higher than a pre-specified temperature. The control circuit controls the current driving means in order to decrease the driving currents to be supplied to the semiconductor light sources upon receipt of the temperature detecting signal. The control circuit sets a priority of each of the semiconductor light sources for decreasing the driving current and decreases the driving current in order from the semiconductor light source having a highest priority.

16 Claims, 3 Drawing Sheets

LIGHTING CONTROLLER OF LIGHTING DEVICE FOR VEHICLE

BACKGROUND OF INVENTION

1. Field of the Invention

The present invention relates to a lighting controller of a lighting device for a vehicle and, more particularly, to a lighting controller of a lighting device for a vehicle that serves to control a lighting operation of a semiconductor light source constituted by a semiconductor light emitting device.

2. Related Art

Conventionally, there has been known a lighting device for a vehicle that uses, as a semiconductor light source, a semiconductor light emitting device, for example, a light emitting diode (LED). A lighting controller for controlling a lighting operation of the LED is mounted on the lighting device for a vehicle of this type.

Some lighting controllers include a single switching regulator, a plurality of current driving portions and a control portion (for example, see Patent Document 1).

The single switching regulator includes a transformer, a capacitor, a diode, an NMOS (Negative Channel Metal Oxide Semiconductor) transistor, and a control circuit. The single switching regulator functions as current supplying means for supplying a driving current to a plurality of LEDs.

A DC voltage input from an on-vehicle battery is converted into an AC voltage at a primary side of the transformer. The AC voltage, thus obtained, by the conversion is rectified by the diode and the current, thus rectified, is smoothed by the capacitor. The DC voltage, thus smoothed, is supplied to each of the LEDs.

Each current driving portion includes a comparison amplifier, an NMOS transistor, a PMOS (Positive Channel Metal Oxide Semiconductor) transistor, and a shunt resistor for detecting an LED driving current, and has a function for controlling ON/OFF operations and dimming of the LED through a constant current. Moreover, it is also possible to add a function for controlling ON/OFF operations to the current driving portion, thereby carrying out a control for changing a duty ratio of the ON/OFF operations.

[Patent Document 1] JP-A-2006-103477 Publication

SUMMARY OF INVENTION

The LED is a semiconductor light source. For this reason, it is impossible to maintain a high temperature state for a long period of time as in a filament light source such as halogen for emitting a light through a heat of a filament having a high temperature or an HID (High Intensity Discharge) lamp for emitting a light by utilizing a discharging phenomenon.

If a radiating member is enlarged, a quantity of discharge of the heat is increased. Therefore, it is possible to maintain the high temperature state of the LED for a long period of time. If the radiating member is enlarged, however, a weight of a lighting device for a vehicle is increased or a cost is raised. For this reason, a size of the radiating member is regulated in such a manner that a performance of the LED is not deteriorated for a certain period.

In many cases, however, a shape of a lighting device for a vehicle having an LED or a shape of a radiating member is varied in case of a different vehicle type. Even if the size of the radiating member is regulated, accordingly, a difference (variation) in a thermal environment performance including a radiating property and durability (a long-term reliability) of the LED is made due to a difference in the shape of the lighting device for a vehicle or that of the radiating member.

In the case in which an arrangement of each of the LEDs is changed with the difference in the shape of the lighting device for a vehicle or that of the radiating member, moreover, temperature of the LED is also varied. Therefore, the difference in the thermal environment performance of the LED is increased still more.

In the case in which the LED is used differently, for example, is used for a high beam, a low beam, a clearance lamp, or a turn signal lamp to constitute the lighting device for a vehicle, furthermore, the quantity of heat generation and a corresponding durability are varied for every LED. For this reason, a difference is also made in the thermal environment performance of the LED as will be described below.

Referring to an LED for the clearance lamp, it is sufficient that a quantity of light of the LED is small. It is preferable to execute a processing for decreasing a mean current to be supplied to the LED, for example, to turn ON the LED in an ON duty of 10%. Therefore, a high thermal environment performance is obtained.

Referring to an LED for the turn signal lamp, it is preferable to carry out flashing in an ON duty of 50%. Therefore, a high thermal environment performance is obtained.

On the other hand, an LED for the low beam requires a large quantity of light and a lighting frequency is also high, and an LED for a high beam requires a large quantity of light. Accordingly, the LEDs for the low beam and the high beam have a low thermal environment performance.

As described above, the difference is made in the thermal environment performance of the LED due to the difference in the shape of the lighting device for a vehicle or the radiating member, a change in the arrangement of the respective LEDs corresponding to the difference, and the different uses of the LED. With the structure according to the prior art, however, there is not carried out a current driving control for the LED corresponding to the difference in the thermal environment performance. For this reason, there is a problem in that temperature and durability of the LED are reduced.

By reducing the driving current to be supplied to each of the LEDs so as to increase the number of the LEDs or using an expensive heat transporting device such as a heat pipe, therefore, it is possible to reduce the temperature of the LED, thereby preventing a deterioration in the durability. However, the measures for increasing the number of the LEDs and using the heat transporting device cannot reduce size and cost of the lighting device for a vehicle.

Therefore, one or more embodiments of the invention provide a lighting controller of a lighting device for a vehicle that prevents deterioration in performance and durability of each LED and reduces weight, size and cost of a lamp unit.

A first aspect of one or more embodiments of the invention is directed to a lighting controller of a lighting device for a vehicle including M (M is an integer of one or more) switching regulators for supplying driving currents to first to Nth (N is an integer of one or more) semiconductor light sources, first to Nth current driving means having first to Nth current detecting portions connected to the semiconductor light sources and serving to detect the driving currents respectively and first to Nth switching portions connected to the semiconductor light sources respectively, the first to Nth current driving means carrying out operations of the switching portions corresponding to magnitudes of the driving currents detected by the current detecting portions respectively, a temperature detector for detecting a temperature and sending a temperature detecting signal when the detected temperature is equal to or higher than a pre-specified temperature, and control means for controlling the current driving means in order to decrease the driving currents to be supplied to the semiconductor light sources upon receipt of the temperature detecting signal, wherein the control means sets a priority of each of the semiconductor light sources for decreasing the driving current and decreases the driving current in order from the semiconductor light source having a higher priority.

In the lighting controller of a lighting device for a vehicle, accordingly, the control means turns ON/OFF the current driving means in order to decrease the driving current to be supplied to each semiconductor light source based on the priority upon receipt of the temperature detecting signal.

A lighting controller of a lighting device for a vehicle according to one or more embodiments of the invention includes M (M is an integer of one or more) switching regulators for supplying driving currents to first to Nth (N is an integer of one or more) semiconductor light sources, first to Nth current driving means having first to Nth current detecting portions connected to the semiconductor light sources and serving to detect the driving currents respectively and first to Nth switching portions connected to the semiconductor light sources respectively, the first to Nth current driving means carrying out ON/OFF operations of the switching portions corresponding to magnitudes of the driving currents detected by the current detecting portions respectively, a temperature detector for detecting a temperature and sending a temperature detecting signal when the detected temperature is equal to or higher than a prespecified temperature, and control means for controlling the current driving means in order to decrease the driving currents to be supplied to the semiconductor light sources upon receipt of the temperature detecting signal, wherein the control means sets a priority of each of the semiconductor light sources for decreasing the driving current and decreases the driving current in order from the semiconductor light source having a higher priority.

According to one or more embodiments of the invention, therefore, a current driving control is carried out over the semiconductor light source corresponding to a function of the semiconductor light source and a difference (variation) in uses. Consequently, it is possible to prevent performance and durability in each semiconductor light source from being deteriorated and to reduce weight, size and cost.

In a second aspect of one or more embodiments of the invention, the priority is set based on thermal environment information including information about a heat resistance of each of the semiconductor light sources, which is preset Therefore, a current driving control is carried out over the semiconductor light source corresponding to a difference (variation) in the thermal environment information of the individual semiconductor light source. Consequently, it is possible to prevent heat resistance and durability in each semiconductor light source from being deteriorated and to reduce weight, size and cost.

In a third aspect of one or more embodiments of the invention, the thermal environment information is set based on light source function information including a use of each of the semiconductor light sources. Therefore, a control for decreasing the driving current to be supplied to the individual semiconductor light source is carried out based on more detailed thermal environment information. Consequently, it is possible to perform a driving control with higher precision, which is coincident with the uses of the semiconductor light source, and to enhance durability and safety in the semiconductor light source on a higher level.

In a fourth aspect of one or more embodiments of the invention, the light source function information is related to at least one of a lighting frequency of each of the semiconductor light sources and a light quantity in an ON operation. Therefore, a control for decreasing the driving current to be supplied to the individual semiconductor light source is carried out based on further detailed thermal environment information. Consequently, it is possible to perform a driving control with higher precision, which is coincident with the uses of the semiconductor light source, and to enhance durability and safety in the semiconductor light source on a higher level.

In a fifth aspect of one or more embodiments of the invention, a plurality of switching regulators is provided, and the driving current is supplied from the different switching regulators from each other to any of the semiconductor light sources that has the highest priority and any of the semiconductor light sources that has the second highest, priority. Therefore, a load applied to all of the switching regulators can be distributed. Consequently, it is possible to prevent a situation in which the load is applied to only a specific one of the switching regulators, i.e., a situation in which only the specific switching regulator is operated continuously.

Other aspects and advantages of the invention will be apparent from the following description, the drawings and the claims.

DETAILED DESCRIPTION

Figure 1:
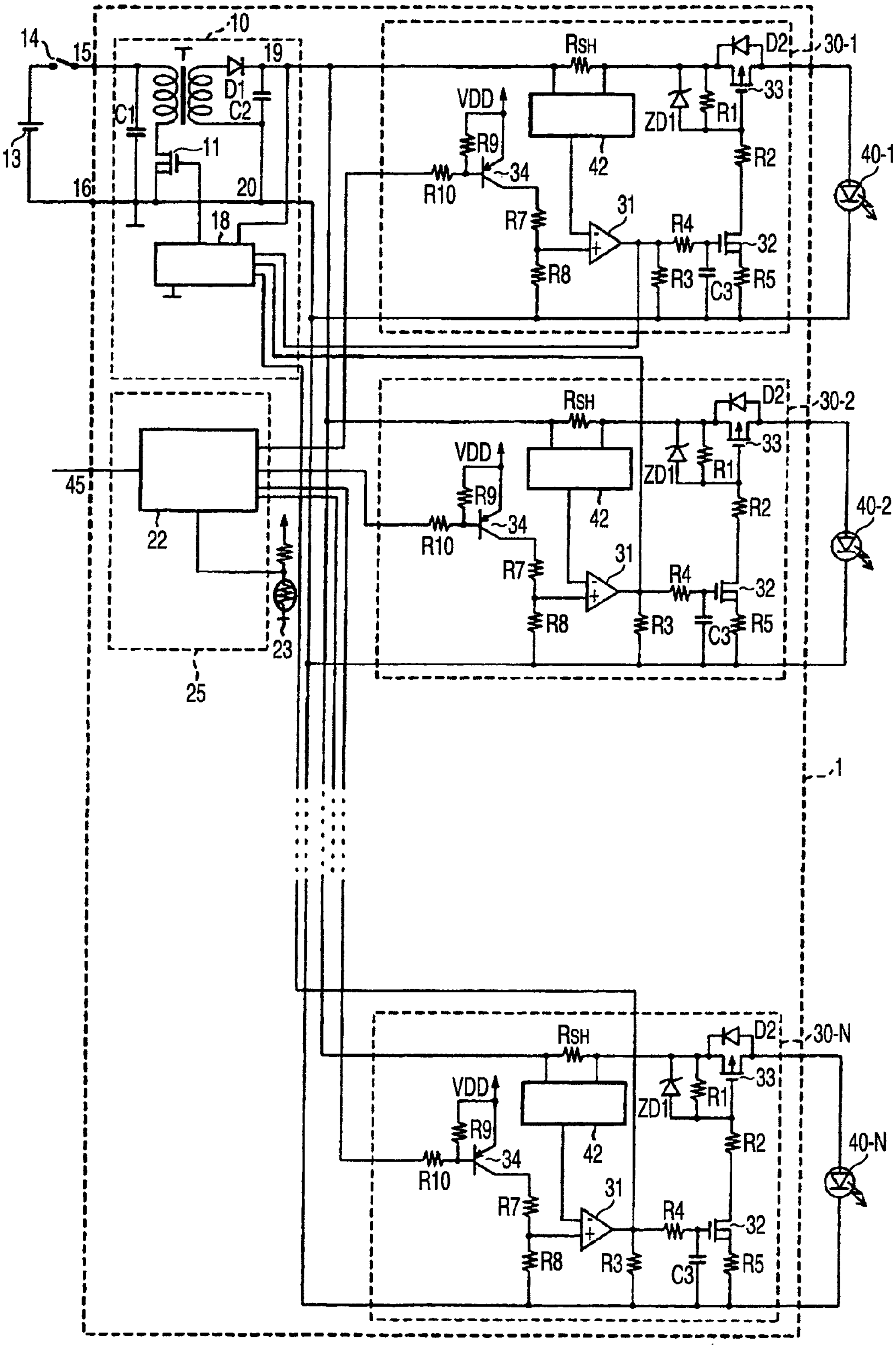
FIG. 1 is a diagram showing a structure of a lighting controller of a lighting device for a vehicle according to a first embodiment of the invention.

A lighting controller of a lighting device for a vehicle according to a first embodiment of the invention will be described below with reference to FIG. 1. FIG. 1 is a diagram showing a structure of the lighting controller of a lighting device for a vehicle according to the first embodiment of the invention.

A lighting controller 1 of a lighting device for a vehicle includes a single switching regulator 10, LEDs 40-1 to 40-N serving as semiconductor light sources, current driving portions 30-1 to 30-N serving as current driving means, a control circuit 25 serving as control means, and a temperature detector 23.

The switching regulator 10 includes capacitors C1 and C2, a transformer T, a diode D1, an NMOS transistor 11, and a switching regulator control circuit 18. Both end sides of the capacitor C1 are connected to power input terminals 15 and 16 respectively, and both end sides of the capacitor C2 are connected to output terminals 19 and 20 respectively. The power input terminal 15 is connected to a positive terminal of an on-vehicle battery 13 and the power input terminal 16 is connected to a negative terminal of the on-vehicle battery 13. The output terminal 19 is connected to an anode side of each of the LEDs 40-1 to 40-N. The output terminal 20 is connected to a cathode side of each of the LEDs 40-1 to 40-N.

The switching regulator 10 serves as a switching regulator of a flyback type and supplies an LED driving current to the LEDs 40-1 to 40-N, and furthermore, controls the LED driving current in such a manner that the LED driving current has a certain value.

In the switching regulator 10, ON/OFF operations of the NMOS transistor 11 are carried out in response to a switching signal output from the switching regulator control circuit 18, for example, a switching signal having a frequency of several tens to several hundreds kHz. A DC voltage input between the power input terminals 15 and 16 is converted into an AC voltage in order to change the DC voltage into a light emitting energy of each of the LEDs 40-1 to 40-N. The AC voltage is rectified on a secondary side of the transformer T.

The DC voltage, thus input, is converted into an AC voltage at a primary side of the transformer T. The AC voltage is rectified by setting, as a rectifying unit, the diode D1 provided on the secondary side, and a rectified current is smoothed by the capacitor C2. A DC voltage, thus smoothed, is supplied to each of the LEDs 40-1 to 40 N.

The current driving portions 30-1 to 30-N have a comparison amplifier 31, and an NMOS transistor 32 and a PMOS transistor 33, which function as switching portions respectively. The current driving portions 30-1 to 30-N supply the LED driving current to the LEDs 40-1 to 40-N. An NPN bipolar transistor may be provided in place of the NMOS transistor 32.

A shunt resistor RSH functioning as a current detecting portion is connected to the anode side of the LEDs 40-1 to 40-N. A differential amplifier 42 is connected in parallel with the shunt resistor RSH. The parallel connection is employed for the following reasons. Because the anode side of the LEDs 40-1 to 40-N is not grounded, a predetermined reference voltage is to be set in order to detect a drop voltage on both ends of the shunt resistor RSH.

A voltage detected in the shunt resistor RSH is applied to a negative input terminal of the comparison amplifier 31 through the differential amplifier 42. A positive input terminal of the comparison amplifier 31 is connected to a collector of a PNP transistor 34 through a resistor R7 and is connected to the output terminal 20 through a resistor R8. A base of the PNP transistor 34 is connected to an ON/OFF signal output terminal of a CPU (Central Processing Unit) 22 constituting the control circuit 25 through a resistor R10.

The PMOS transistor 33 is connected to the anode side of the LEDs 40-1 to 40-N.

The control circuit 25 has the CPU 22, an RAM (Random Access Memory which is not shown), and an ROM (Read Only Memory which is not shown).

The temperature detector 23 is connected to the CPU 22. Examples of the temperature detector 23 include a thermistor (Thermally Sensitive Resistor). The temperature detector 23 has a temperature coefficient with which a resistance value is rapidly changed when a predetermined temperature (a Curie temperature: Tc) is reached, for example. It is sufficient to employ a temperature detector for sending a signal to give information about a temperature according to the change in the resistance value, that is, a voltage drop. Accordingly, embodiments of the invention are not restricted to a thermistor.

Although the temperature detector 23 is disposed in a light emitting device in the first embodiment, it may be disposed in a radiating member (not shown) provided in the lighting controller 1 or a housing of a light source unit constituting a lighting device for a vehicle.

Figure 3:
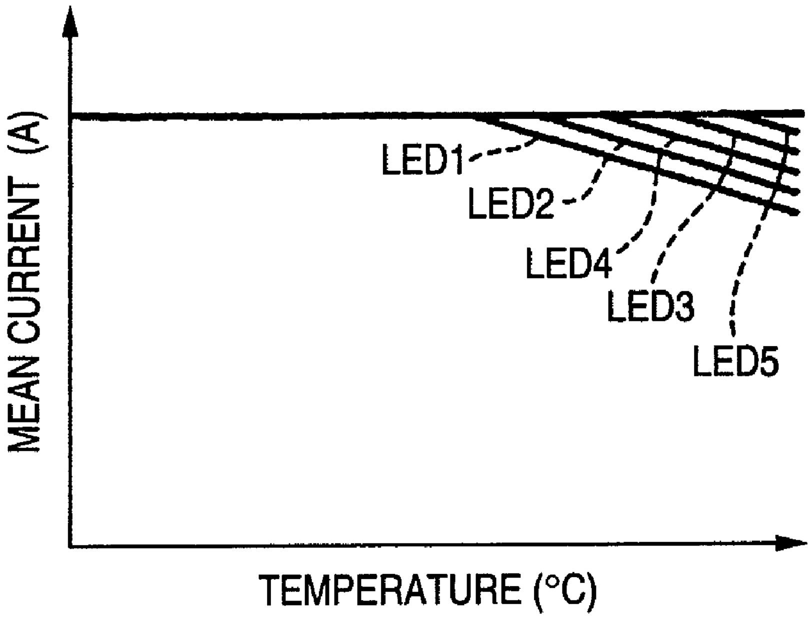
FIG. 3 is a graph showing a relationship between a temperature detected by a temperature detector and a mean current supplied to an LED.
Figure 4:
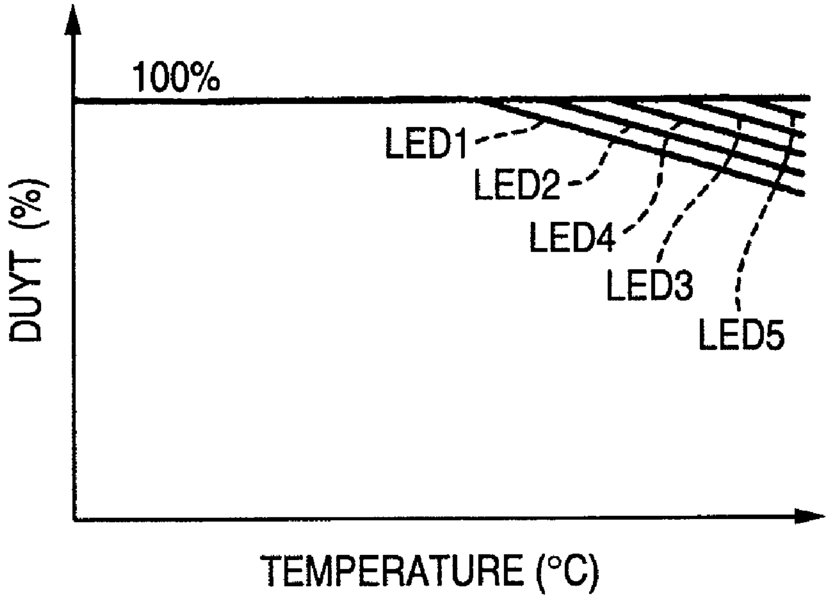
FIG. 4 is a graph showing a relationship between a temperature detected by a temperature detector and a duty of a current supplied to an LED.

An operation of the lighting controller 1 according to the first embodiment will be described below. FIG. 3 is a graph showing a relationship between a temperature (° C.) detected by the temperature detector and a mean current (A) supplied to the LED. FIG. 4 is a graph showing a relationship between the temperature (° C.) detected by the temperature detector and a duty (%) of a current supplied to the LED.

The CPU 22 controls each of the current driving portions 30-1 to 30-N in order to decrease the LED driving current supplied to the LEDs 40-1 to 40-N in order of a priority based on thermal environment information which will be described below upon receipt of a temperature detecting signal sent when the temperature detected by the temperature detector 23 is equal to or higher than a pre-specified temperature.

FIG. 1 shows the LED constituting the lighting device for a vehicle as the LEDs 40-1 to 40-N. Description will be given to the case in which N=5 is set and the LEDs 40-1, 40-2, 40-3, 40-4 and 40-5 are used as LEDs for a first low beam, a second low beam, a third low beam, a high beam, and a turn signal, respectively. Moreover, description will be given on the assumption that the LEDs 40-1 to 40-5 are set to be LEDs 1 to 5, respectively.

Thermal environment information including light source function information (information about a use of a light source) such as a lighting frequency of each of the LEDs 1 to 5 and a light quantity in a lighting operation and information about a quantity of heat generation and a durability are prestored in a storing portion such as an ROM in the CPU 22. The priority of each of the LEDs 1 to 5 is set based on the thermal environment information and information about the set priority (priority information) is stored in the storing portion such as the ROM in the CPU 22. A factor for setting the priority indicates the information about the lighting frequency, the light quantity in the lighting operation, the quantity of heat generation, and the durability as described above.

A method of setting the priority will be described below with reference to Table 1. Usually, a vehicle runs with a low beam turned ON and increases the low beam or turns ON a high beam corresponding to a condition of a road. In a right or left turn, a turn lamp is turned ON.

In order to implement a predetermined light distribution pattern, which is required for the low beam, an irradiation pattern obtained by turning ON the LED 1 and an irradiation pattern obtained by turning ON the LED 2 are synthesized with each other. In the case in which a light quantity of the low beam is to be increased, it is possible to implement a low beam pattern having a light quantity increased more greatly than usual by turning ON the LED 3. Furthermore, the high beam and the turn signal lamp are turned ON if necessary.

The lighting frequency will be considered. The LEDs 1 and 2 for a low beam, which are to be always turned ON when the low beam is turned ON have an equal lighting frequency, that is, the highest lighting frequency. The LED 3 for increasing a low beam, the LED 5 for a turn and the LED 4 for a high beam have lower lighting frequencies in this order.

The LEDs 1, 4, 2, 3 and 5 have smaller light quantities in this order.

The thermal environment information is set based on the order of the lighting frequency and the light quantity, and the priority is set based on the thermal environment information. In the example shown in Table 1, the LEDs 1, 2, 4, 3 and 5 have a lower priority in this order in consideration of light source function information including the lighting frequency and the light quantity.

Although the priority is set in consideration of both the lighting frequency and the light quantity in the Table 1, the priority may be set based on the light source function information about one of the lighting frequency and the light quantity or may be set based on the other light source function information. More specifically, the method of setting the priority is optional and the priority may be set by changing a combination of the various factors or the weighting of each of the factors.

TABLE 1

| | Lamp Function | | | | |
|---|---|---|---|---|---|
| | Low | | | High | Turn |
| | LED Number | | | | |
| | LED 1 | LED 2 | LED 3 | LED 4 | LED 5 |
| Priority | 1 | 2 | 4 | 3 | 5 |
| Lighting Frequency | 1 | 1 | 3 | 5 | 4 |
| Light Quantity | 1 | 3 | 4 | 2 | 5 |

Next, how to control the current driving portions 30-1 to 30-N by the CPU 22 will be described based on the preset priority information.

The CPU 22 decreases the mean current supplied to the LEDs 1 to 5 based on a mean current-temperature characteristic shown in FIG. 3 upon receipt of the temperature detecting signal sent from the temperature detector 23. In FIG. 3, an axis of ordinate indicates a mean current (A) and an axis of abscissa indicates a temperature (° C.) detected by the temperature detector 23.

More specifically, the CPU 22 sends an ON/OFF signal (for example, a high level signal or a low level signal) to bases of the PNP transistor 34 and the NPN transistor 35 in each of the current driving portions 30-1 to 30-N upon receipt of the temperature detecting signal, and causes the PNP transistor 34 and the NPN transistor 35 to carry out a switching operation.

When the high level signal is sent from the CPU 22, the PNP transistor 34 carries out an OFF operation and the NPN transistor 35 carries out an ON operation. Therefore, an application speed of a voltage to the positive input terminal of the comparison amplifier 31 is changed corresponding to the ON/OFF operations. The comparison amplifier 31 repeats the transmission/non-transmission of a comparing output signal to turn ON/OFF the NMOS transistor 32 and to turn ON/OFF the PMOS transistor 33. In the ON operation, the PMOS transistor 33 is actively operated to control a current flowing to the LED to have a certain value.

It is possible to change a magnitude of the mean current supplied to the LEDs 1 to 5 by varying a switching cycle for turning ON/OFF the PMOS transistor 33, that is, a duty ratio (a ratio of ON duty to OFF duty). The LEDs 1 to 5 repeat flashing at a high speed in the cycle of the ON/OFF operations in accordance with the set duty.

Accordingly, the CPU 22 has a function for decreasing the mean current supplied to the LEDs 1 to 5 in accordance with a ratio of ON duty to OFF duty in the LED driving current flowing to the LEDs 1 to 5 and a temperature characteristic (a duty temperature characteristic shown in FIG. 3) upon receipt of the temperature detecting signal sent from the temperature detector 23. In FIG. 4, an axis of ordinate indicates a duty (%) and an axis of abscissa indicates a temperature (° C.) detected by the temperature detector 23. A decrease starting temperature of the duty for each of the LEDs 1 to 5 is preset based on the thermal environment information of each of the LEDs 1 to 5 and information about the decrease starting temperature is stored in the storing portion such as the ROM in the CPU 22.

As described above, when the mean current supplied to the LEDs 1 to 5 is to be decreased, the PNP transistor 34 is preferably subjected to a switching control in order to decrease the ON duty (%) in the PMOS transistor 33.

As shown in FIG. 4, the ON duty is decreased in descending order of the priority based on a rise in the temperature.

The decrease starting temperature of the mean current supplied to each of the LEDs 1 to 5 (see FIG. 3) and the decrease starting temperature of the ON duty (see FIG. 4) are preset in ascending order of the LED 1, the LED 2, the LED 4, the LED 3 and the LED 5.

Although the decrease starting temperature of the mean current and the decrease starting temperature of the ON duty in the LEDs 1, 2, 4, 3 and 5 are set at a regular interval as shown in Example 1 of Table 2 below, for instance, it is also possible to optionally set the interval corresponding to a situation of a thermal environment of each of the LEDs in place of the regular interval (see Example 2 of Table 2 below).

TABLE 2

| | | LED Number | | | | |
|---|---|---|---|---|---|---|
| | | LED 1 | LED 2 | LED 3 | LED 4 | LED 5 |
| Current Decrease Starting Temperature | Example 1 | 100° C. | 105° C. | 110° C. | 115° C. | 120° C. |
| | Example 2 | 100° C. | 102° C. | 105° C. | 120° C. | 130° C. |

Moreover, a gradient of each of the graphs in FIGS. 3 and 4 (a decrease in a mean current per degree of a rise in a temperature) may also be varied for each of the LEDs 1 to 5. The temperature shown herein is detected by the temperature detector 23 to the utmost and does not indicate a temperature of each of the LEDs 1 to 5 itself In the first embodiment, the high beam is also turned ON in addition to the low beam. In the case in which the ON operation of the high beam may be excluded from a control target (for example, the case in which the LED is not used for the high beam), the LED 3 has a third priority and the LED 4 has a fourth priority or more. In that case, the decrease starting temperature of the mean current supplied to the LED 3 may be changed into an equal temperature to that of the LED 4 or does not need to be changed.

According to the first embodiment, thus, the thermal environment information of each of the LEDs 1 to 5 is preset and there is carried out a control for setting, into a first priority, any of the LEDs that is to first decrease the LED driving current and setting, into a fifth priority, any of the LEDs that is to last decrease the LED driving current based on the thermal environment information, and for decreasing the LED driving current supplied to the LED in accordance with the priority based on a mean current-temperature characteristic and a duty temperature characteristic in each of the LEDs as described above. Accordingly, it is possible to carry out an LED driving control which is coincident with the use (function) of each of the LEDs, thereby enhancing durability and safety in the LED.

It is also possible to provide a communicating apparatus, for example, without using the temperature detector, thereby acquiring, as temperature information, an outside air temperature or other temperatures through a communication by means of the communicating apparatus.

Figure 2:
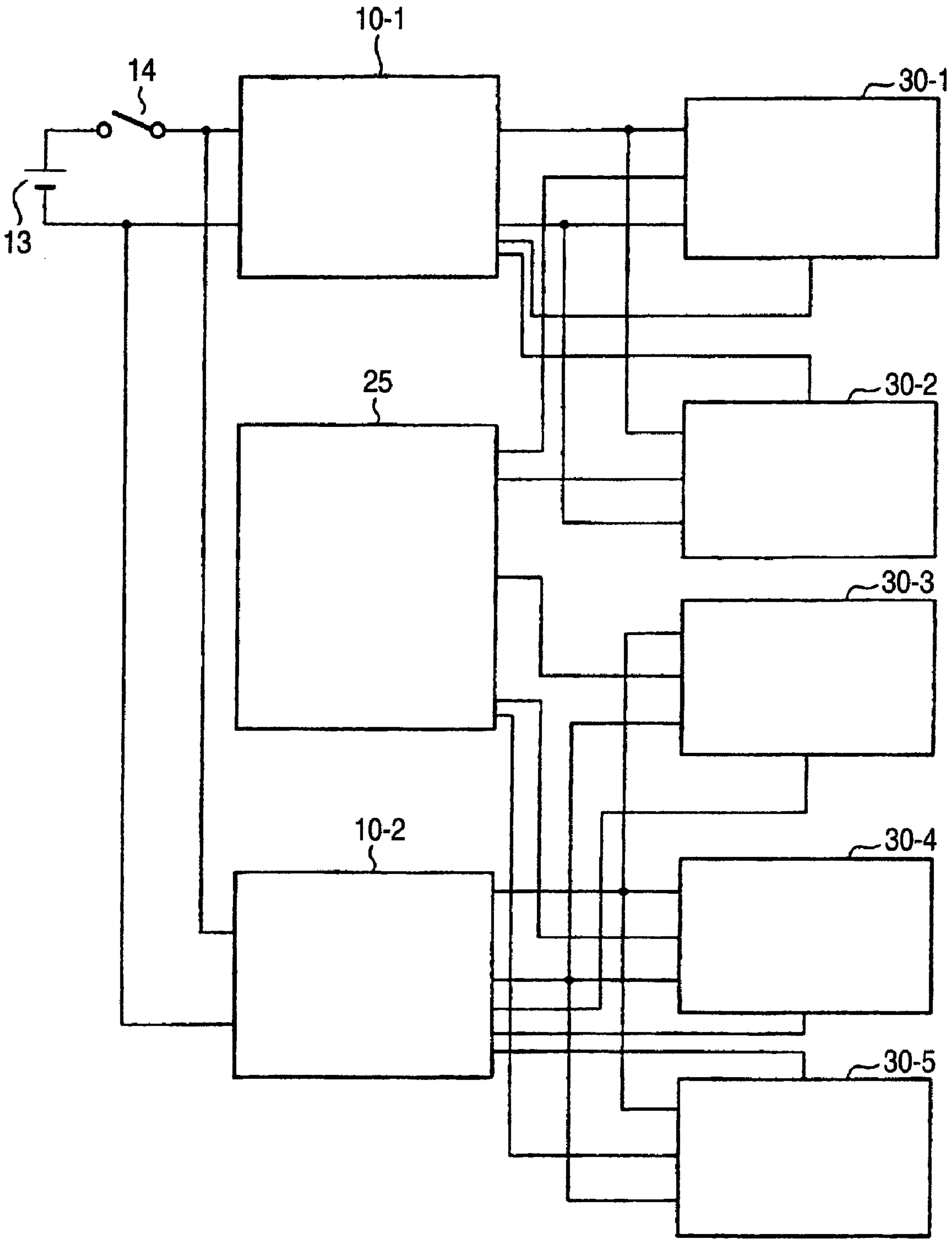
FIG. 2 is a diagram showing a structure of a lighting controller of a lighting device for a vehicle according to a second embodiment of the invention.

A lighting controller of a lighting device for a vehicle according to a second embodiment of the invention will be described below with reference to FIG. 2. FIG. 2 is a block diagram showing a lighting controller in the case in which a plurality of switching regulators is provided.

The second embodiment is different from the first embodiment in that the switching regulators are provided. In the following description of the second embodiment, therefore, description of the same portions as those in the first embodiment will be omitted.

In a situation in which an ambient temperature of the LED is raised so that the thermal environment of the LED is harsh, the thermal environment is harsh for a switching regulator having a function for supplying a driving current.

For example, in the case in which an LED driving current is supplied through current driving portions 30-1 and 30-2 from a switching regulator 10-1 to the LEDs 1 and 2 having a high use frequency (a harsh thermal environment), the switching regulator 10-1 continuously supplies the LED driving current (a mean current). Therefore, a great load is applied to the switching regulator 10-1. On the other hand, in the case in which the LED driving current is supplied through current driving portions 30-3 to 30-5 from a switching regulator 10-2 to the LEDs 3 to 5 having a low use frequency (a gentle thermal environment), a total time required for supplying the LED driving current (the mean current) is shorter and a smaller load is applied to the switching regulator 10-2 as compared with the switching regulator 10-1.

Accordingly, different loads are applied to the switching regulators 10-1 and 10-2 per time. More specifically, there is a problem in that only a specific one of the switching regulators is operated continuously and durability is thus deteriorated.

In the second embodiment, therefore, the LED driving current is supplied from the switching regulators 10-1 and 10-2 to the LED 1 having the highest priority and the LED 2 having the second highest priority, respectively.

Description will be given on the assumption that the switching regulators 10-1 and 10-2 are provided and a current decrease starting temperature in each of the LEDs 1 to 5 is set as shown in Example 2 of Table 2.

For example, when a temperature detected by a temperature detector 23 is 105° C., a CPU 22 carries out a control for decreasing the LED driving current to be supplied to the LEDs 1 and 2. By supplying the LED driving current to the LEDs 1 and 2 through the switching regulators 10-1 and 10-2 as described above, therefore, it is possible to distribute the load applied to the switching regulators 10-1 and 10-2.

In Table 3 below, the LEDs belonging to the switching regulators 10-1 and 10-2 are thus divided into groups in consideration of the distribution of the load.

TABLE 3

| Switching Regulator 10-1 | | Switching Regulator 10-2 | | |
|---|---|---|---|---|
| LED1 | LED4 | LED2 | LED3 | LED5 |

By carrying out the lighting control according to the first embodiment based on the grouping shown in Table 3, it is also possible to decrease the load (burden) applied to the LED while distributing the load applied to the switching regulators 10-1 and 10-2.

Each of the embodiments is only illustrative for suitably carrying out the invention and the invention can be variously changed and carried out without departing from the scope thereof.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

[Description of the Reference Numerals]

1 . . . lighting controller, 10, 10-1, 10-2 . . . switching regulator, 11, 32 . . . NMOS transistor, 13 . . . on-vehicle battery, 14 . . . switching device, 15, 16 . . . power input terminal, 18 . . . switching regulator control circuit, 19, 20 . . . output terminal, 22 . . . CPU, 23 . . . temperature detector, 25 . . . control circuit, 30-1 to 30-N . . . current driving portion, 31 . . . comparison amplifier, 33 . . . PMOS transistor, 34 . . . PNP transistor, 40-1 to 40-N . . . LED, 42 . . . differential amplifier, 45 . . . communicating signal input terminal

What is claimed is:

1. A lighting controller of a lighting device for a vehicle comprising:

M switching regulators for supplying driving currents to first to Nth semiconductor light sources, wherein M is an integer number equal to or greater than one and N is an integer number greater than one;

first to Nth current driving means comprising:

first to Nth current detecting portions connected to the semiconductor light sources and serving to detect the driving currents respectively; and first to Nth switching portions connected to the semiconductor light sources respectively, wherein the first to Nth current driving means operates the switching portions corresponding to magnitudes of the driving currents detected by the current detecting portions respectively;

a temperature detector for detecting a temperature and sending a temperature detecting signal when the detected temperature is equal to or higher than a prespecified temperature; and control means for controlling the current driving means in order to decrease the driving currents to be supplied to the semiconductor light sources upon receipt of the temperature detecting signal, wherein the control means sets an order of priority of each of the semiconductor light sources for decreasing the driving current, and wherein the control means decreases the driving current according to the order of priority, such that the driving current is decreased most for a semiconductor light source having a highest priority, and is decreased progressively less in descending order of priority.

2. The lighting controller of a lighting device for a vehicle according to claim 1, wherein the order of priority is set based on thermal environment information including information about a preset heat resistance of each of the semiconductor light sources.

3. The lighting controller of a lighting device for a vehicle according to claim 2, wherein the thermal environment information is set based on light source function information including information about a use of each of the semiconductor light sources.

4. The lighting controller of a lighting device for a vehicle according to claim 3, wherein the light source function information is related to at least one of a lighting frequency of each of the semiconductor light sources and a light quantity in an ON operation.

5. The lighting controller of a lighting device for a vehicle according to claim 2 further comprising: a plurality of switching regulators, wherein the driving current to any of the semiconductor light sources having the highest priority is supplied from a different switching regulator than any of the semiconductor light sources having the second highest priority.

6. The lighting controller of a lighting device for a vehicle according to claim 3 further comprising: a plurality of switching regulators, wherein the driving current to any of the semiconductor light sources having the highest priority is supplied from a different switching regulator than any of the semiconductor light sources having the second highest priority.

7. The lighting controller of a lighting device for a vehicle according to claim 4 further comprising: a plurality of switching regulators, wherein the driving current to any of the semiconductor light sources having the highest priority is supplied from a different switching regulator than any of the semiconductor light sources having the second highest priority.

8. The lighting controller of a lighting device for a vehicle according to claim 1 further comprising: a plurality of switching regulators, wherein the driving current to any of the semiconductor light sources having the highest priority is supplied from a different switching regulator than any of the semiconductor light sources having the second highest priority.

9. A lighting controller of a lighting device for a vehicle comprising:

M switching regulators for supplying driving currents to first to Nth semiconductor light sources, wherein M is an integer number equal to or greater than one, and N is an integer number greater than one;

first to Nth current driving portions comprising:

first to Nth current detecting portions connected to the semiconductor light sources and serving to detect the driving currents respectively; and first to Nth switching portions connected to the semiconductor light sources respectively, wherein the first to Nth current driving portions operate the switching portions based on the driving currents detected by the current detecting portions respectively;

a temperature detector for detecting a temperature and sending a temperature detecting signal when the detected temperature is equal to or higher than a prespecified temperature; and a control circuit for controlling the current driving portions in order to decrease the driving currents to be supplied to the semiconductor light sources upon receipt of the temperature detecting signal, wherein the control circuit sets an order of priority of each of the semiconductor light sources for decreasing the driving current, and wherein the control means decreases the driving current according to the order of priority, such that the driving current is decreased most for semiconductor light source having a highest priority, and is decreased progressively less in descending order of priority.

10. The lighting controller of a lighting device for a vehicle according to claim 9, wherein the order of priority is set based on thermal environment information including information about a preset heat resistance of each of the semiconductor light sources.

11. The lighting controller of a lighting device for a vehicle according to claim 10, wherein the thermal environment information is set based on light source function information including information about a use of each of the semiconductor light sources.

12. The lighting controller of a lighting device for a vehicle according to claim 11, wherein the light source function information is related to at least one of a lighting frequency of each of the semiconductor light sources and a light quantity in an ON operation.

13. The lighting controller of a lighting device for a vehicle according to claim 10 further comprising: a plurality of switching regulators, wherein the driving current to any of the semiconductor light sources having the highest priority is supplied from a different switching regulator than any of the semiconductor light sources having the second highest priority.

14. The lighting controller of a lighting device for a vehicle according to claim 11 further comprising: a plurality of switching regulators, wherein the driving current to any of the semiconductor light sources having the highest priority is supplied from a different switching regulator than any of the semiconductor light sources having the second highest priority.

15. The lighting controller of a lighting device for a vehicle according to claim 12 further comprising: a plurality of switching regulators, wherein the driving current to any of the semiconductor light sources having the highest priority is supplied from a different switching regulator than any of the semiconductor light sources having the second highest priority.

16. The lighting controller of a lighting device for a vehicle according to claim 9 further comprising: a plurality of switching regulators, wherein the driving current to any of the semiconductor light sources having the highest priority is supplied from a different switching regulator than any of the semiconductor light sources having the second highest priority.

* * * * *